Jan. 5, 1971  M. J. SPANGLER  3,553,690
RADIATION SENSITIVE SYSTEM
Filed June 19, 1968  2 Sheets-Sheet 1

WITNESSES
Theodore F. Wrobel
James F. Young

INVENTOR
Murry J. Spangler
BY Ernest P. Klipfel
ATTORNEY

United States Patent Office 3,553,690
Patented Jan. 5, 1971

3,553,690
RADIATION SENSITIVE SYSTEM
Murry J. Spangler, Ellicott City, Md., assignor to Westinghouse Electric Corporation, Pittsburgh, Pa., a corporation of Pennsylvania
Filed June 19, 1968, Ser. No. 738,296
Int. Cl. G01s 7/12, 7/22
U.S. Cl. 343—11                                                13 Claims

ABSTRACT OF THE DISCLOSURE

This invention relates to a system for operating a radiation sensitive device such as a television camera tube to derive an output signal in a $\rho$, $\theta$ scanning (PPI) format. In one illustrative embodiment, this invention includes a Dove prism for optically rotating an image which is focused onto the photosensitive portion of the television camera tube. The television camera device is operated to sense a single line of the image focused thereon. As the image is rotated past the radiation sensitive portion of the television camera tube, an electrical signal is derived therefrom in a $\rho$, $\theta$ format. This system has an important application in use with radar systems where it is desired to superimpose the image of a map onto the display screen of the radar system.

BACKGROUND OF THE INVENTION

Field of the invention

This invention relates to radiation sensitive systems including a camera device for deriving in a $\rho$, $\theta$ scanning format a signal which is amplitude modulated in accordance with the intensity of the radiation image directed thereon.

Description of the prior art

In a typical radar system, information is derived from a rotating antenna and is displayed upon a suitable PPI (Plan Position Indicator) display device such as a cathode ray tube. More specifically, the radar system may include a transmitter for generating a series of pulses which are radiated by the antenna onto an object whose position (i.e. bearing and range) is to be measured. An echo of the radiated signal is reflected back to the antenna, which in turn applies the return or echo signal to a receiver. The transmission time between the radiated signal and the received signal is measured to determine the distance of the target from the antenna.

Typically, the antenna is rotated by a suitable servomotor to detect targets within a defined area about the centrally orientated antenna. A convenient form for realistically displaying the range and bearing data from such targets is a PPI (Plan Position Indicator). In order to display the information as a plan position display, a cathode ray tube is operated to provide a $\rho$, $\theta$ scanning pattern of the electron beam. In a $\rho$, $\theta$ mode of operation, the electron beam begins to scan at the approximate center of the screen and moves radially outward toward the periphery of the screen. Received echos or return signals from the target are applied to the cathode ray tube in such a way to produce intensity modulation of the electron beam scanning the cathode ray screen. An increase in intensity of the electron beam is produced whenever a target is detected thereby providing a bright spot upon the screen of the cathode ray tube. An indication of the range or distance of the target from the antenna is made by noting the distance of the bright spot of light from the center of the cathode ray tube screen. In other words, if a target appears at the center of the screen, its range is zero. If a target appears at the periphery of the screen, its distance is the maximum range for which the radar display system is adjusted.

Further, the sweep of the beam of electrons across the screen of the cathode ray tube indicates the angular position or bearing of a target with respect to a fixed reference. As the antenna rotates, the linear sweep of the beam of electrons must also rotate in synchronism with the antenna. More specifically, at the start of the transmitter pulse, the beam of electrons begins to move outwardly from the center towards the periphery of the screen. At the end of the first sweep, the beam moves rapidly back to the center of the screen thus completing the first sweep. At the start of the next transmitted pulse, a second sweep is made across the screen which is rotated by a predetermined angle. This process continues until the sweep of the electron beam has rotated about the surface of the screen. As stated above, the sweep of the beam of electrons across the screen and the antenna are synchronized so as to indicate the relative position of the target upon the cathode ray tube. The angle of displacement of the sweeps depends upon the number of transmitted pulses per second and the speed of the antenna. By the time the antenna has completed one revolution, the entire screen has been covered with a series of narrowly separated, radial sweeps. In this manner, a radar system may be operated to provide information as to the distance of the object from the antenna and also the relative position or bearing of the object with regard to the radar system.

It is often desirable to superimpose the image of a map or other information onto the display screen of the cathode ray tube. In this manner, the location of the target which has been sensed by the above-described radar system may be displayed in a relationship with the indicia of the map. Typically, the location of such objects as national boundaries, landing fields, or other objects could be clearly outlined simultaneously upon the display device of the radar system. In the prior art, this has been accomplished by writing or tracing with an appropriate pencil over the surface of the cathode ray tube to thereby superimpose various objects upon the display screen. However, this method of superimposing images upon the cathode ray tube has a serious limitation due to the parallax of the viewer's position which may cause certain errors in determining the range and bearing of the targets. Further, the use of a marking pencil prevents the adjustment of the range of the radar system without rendering the penciled images irrelevant with regard to the new display of information.

In order to overcome these disadvantages, the image derived from a prepared slide or transparency may be electronically superimposed upon the image derived from the radar system upon the display screen of a PPI cathode ray tube. Typically, these systems employ a flying spot scanner device for scanning a beam of radiation across a transparency, and a suitable photomultiplier for detecting the beam of radiation directed through the transparency. In one embodiment of the prior art, the flying spot scanner is operated to scan in a PPI mode and the photomultiplier provides a modulated signal whose amplitude is dependent upon the information of the transparency. In a second embodiment of the prior art, a cathode ray tube is operated to scan a beam of radiation in a repeating, linear fashion across the transparency, and the slide or transparency is rotated by a suitable servomotor to obtain the $\theta$ scan. Though the above-described systems utilizing flying spot scanners enjoy the advantage of relatively high resolution, these systems typically require that the slides or transparencies be prepared from maps by photographic processes, which require that slide preparation take place at a site remote from the radar system. It is often necessary to reduce the slide or transparency in order to be used with a flying spot scanner. Further, the use of a flying spot scanner and a photomultiplier requires that the size of these systems (typically known as mappers) are quite large thereby making it difficult to transport these systems to remote areas.

Another approach to the problem of superimposing images onto the screen of a cathode ray tube would be to use a television camera device to sense the desired image and then to electronically mix the images to be presented upon the cathode ray tube screen. Such a system is described in U.S. Pat. No. 2,986,596 by W. M. Hammond, Jr. wherein a first television camera is used to sense and to provide an electrical signal corresponding to a first image, and a second camera is used to view a surface upon which is written the information which is to be superimposed electronically upon the first image. As more fully disclosed in this patent, suitable deflection circuits are used for synchronizing the scans of the two television cameras and of the cathode ray tubes together so that the images may be placed simultaneously together upon the screen of the cathode ray tube. It appears that the above-identified patent is particularly related to those systems where the television cameras and the cathode ray tubes are operated in the normal horizontal-vertical scan mode as is used in commercial television.

However, problems arise when it is attempted to operate a television camera in a $\rho, \theta$ mode to view a first image and to electronically superimpose the first image and a second image upon display screen of a cathode ray tube. As explained in a copending application entitled "Radiation Sensitive System," Ser. No. 612,882, now Pat. No. 3,388,395, by E. P. Gumphrey and M. J. Spangler and assigned to the assignee of this invention, a television camera tube such as a vidicon may be scanned in a $\rho, \theta$ mode to derive an electrical signal corresponding to a first image which is sensed by the television camera tube. As explained in the above-identified copending application, the scanning of a target element of the vidicon camera tube in a $\rho, \theta$ mode results in an uneven saturation of various portions of the target due primarily to the nature of the $\rho, \theta$ scan. More specifically, the period of times between successive scans is not constant for various points of a target scanned in a $\rho, \theta$ mode. In particular, the central portions of the target are scanned more rapidly thereby saturating this portion of the target, whereas the peripheral portions are scanned at greater intervals and do not have the same tendency to become saturated. As disclosed in the above-identified copending application, means are provided for compensating for the varying degrees of amplitude saturation on a line by line basis to provide an electrical output signal which is proportional to the intensity of the radiation directed upon the camera tube. However, such systems may suffer from a decrease of resolution at the edges of the image and may not be suitable for use with extremely wide variations in antenna scan rates and radar trigger frequencies because of certain deficiencies in the particular type of camera tube which may be used in these systems. In addition, the slow scan type of vidicon tubes which may be used in the system of the above-identified copending application tend to be more expensive than other types of television camera tubes.

It is therefore an object of this invention to provide a new and improved radiation sensitive system for providing an electrical signal corresponding to a radiation image in a $\rho, \theta$ mode with devices which are less expensive than those of the prior art, with improved resolution, and in a mode of operation which avoids the needs of photographically prepared transparencies or slides.

SUMMARY OF THE INVENTION

These and other objects are accomplished in accordance with the teachings of this invention by providing a new and improved system for sensing a radiation image including suitable means for providing an electrical output signal corresponding to a line of the radiation image and means for optically rotating the radiation image with the radiation sensitive means. In an illustrative embodiment, this system may include a television camera device having a target element which is scanned by an electron beam in a repetitive, linear fashion to thereby derive an electrical output signal corresponding to a line of the radiation image, and suitable optical means such as a Dove prism and a suitable optical lens assembly for rotating and focusing the radiation onto the radiation sensitive portion of the television camera device.

Such a system as described above has a particular application in a radar system where it is desired to superimpose the outline of a map onto the image displayed by the PPI display of the radar system. Radar systems typically include a receiver for sensing the echo pulses derived from an antenna, a suitable PPI display such as a cathode ray tube which is scanned in a $\rho, \theta$ mode, an appropriate servomechanism for rotating the antenna, and appropriate sweep generators to synchronize the rotation of the antenna with the $\rho, \theta$ scan of the PPI display, and to initiate the $\rho$ scan of the television camera tube and the PPI display in synchronization with the transmission of the radar pulses.

DESCRIPTION OF THE DRAWINGS

These and other objects and advantages of the present invention will become more apparent in view of the following description and drawings, in which.

DESCRIPTION OF THE PREFERRED EMBODIMENT

Figure 1:
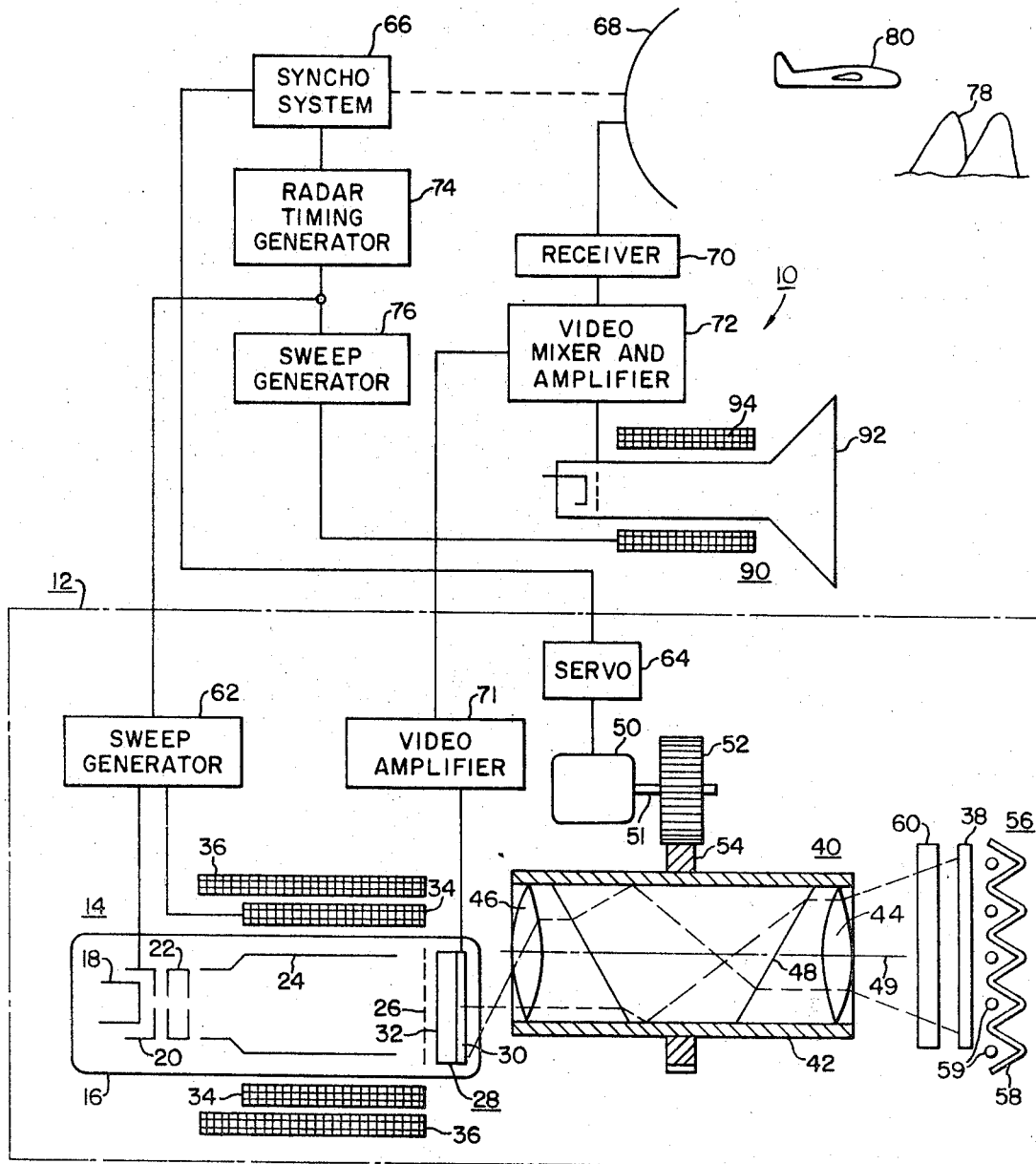
FIG. 1 is a diagrammatic view of a radar system including a radiation system in accordance with the teachings of this invention for deriving an output signal in a $\rho, \theta$ mode corresponding to the radiation image derived from a transparency.

Referring now to the drawings and in particular to FIG. 1, there is shown a radar system 10 incorporating a radiation sensitive system 12 for sensing the radiation image of a map or suitable transparency 60 in accordance with the teachings of this invention. As described above, suitable high energy pulses are generated and applied by a transmitter (not shown) to an antenna 68 to be radiated therefrom as the antenna 68 is rotated by an appropriate synchro system 66. The radiated pulses are directed from the antenna 68 and strike surounding objects such as an airplane 80 and a mountain 78. An echo of the transmitted signal is returned to the antenna 68, which is in turn transmits the echo signal to a receiver 70 for processing. The receiver 70 provides an output signal corresponding to the range (i.e. the distance of the objects 80 and 78 from the antenna 68) to a video mixer and amplifier 72. The video mixer and amplifier 72 applies a video signal to a suitable display device such as a cathode ray tube 90. A beam of electrons is generated within the cathode ray tube 90 and is scanned across a fluorescent screen 92 by a set of deflection coils 94 in a $\rho, \theta$ or PPI scanning pattern. The deflection coils 94 are energized by a sweep generator 76 which provides suitable $\rho, \theta$ sweep voltages. The sweep generator 76 is synchronized with the rotation of the antenna 68 by signals derived from a radar timing generator 74 so that the relative position and bearing of the objects viewed by the radar system 10 may be appropriately displayed upon the cathode ray tube 90. The radar timing generator 74 is connected to the synchro system 66 to derive a signal indicative of the bearing or orientation of the antenna 68 and also with the transmitter (not shown) to derive an indication of the generation and transmission of the radar signals radiated from the antenna 68. As a result, when a return pulse is received by the antenna 68, a corresponding bright spot appears upon the fluorescent screen 92.

Illustratively, the synchro system 66 may include an appropriate servo motor for rotating the antenna 68 and a closed loop feedback system for accurately controlling the speed of the servo motor. Typically a suitable control transformer includes a rotor to which appropriate reference signals are applied, and suitable control stator windings from which output signals may be taken. Further, the rotor may be mechanically connected to the servo motor by a suitable gear train. As the rotor of the transformer is rotated by the servo motor, output signals are derived from the stator windings which are applied through an appropriate servo amplifier to provide a low impedance drive to the servo motor. Depending upon the phase of the output signal derived from the stator winding and the phase of the input signal to the rotor, the servo motor will turn either clockwise or counterclockwise. In addition, the synchro system 66 may include a position sensitive device such as a resolver, synchro control transmitter, or a shaft position encoder having a shaft which is mechanically geared to the rotating antenna 68 and which provides an output signal indicating the position of the antenna 68. The output signals derived from the position sensing device are applied to a suitable system such as a phase detector circuit for detecting the information contained in the modulated waveform of these signals. The output signals of the detector circuits illustratively take the form of two slowly varying AC signals whose frequenly depends upon the rotational velocity of the antenna 68 and whose relative phase indicates the position of the antenna 68. This signal indicating the angular position and speed of the antenna 68 is then fed into a sweep generator 62. Further, the signal derived from the synchro system is applied to the sweep generator 76 which provides suitable deflection current signals to be applied to the horizontal and vertical deflection coils 94 associated with the cathode ray tube 90. As explained above, this insures that the sweep of the electron across the screen 92 is synchronized with the rotation of the antenna 68.

It is an important object of this invention that the radiation sensitive system 12 be capable of superimposing an image upon the screen 92 of the cathode ray tube 90 corresponding to the information contained upon the map or transparency 60. The radiation system 12 further includes a radiation sensitive device 14 capable of providing output signals corresponding to a single line of the radiation image derived from the transparency 60. As will be explained in greater detail later, the radiation sensitive system 12 also includes means for optically rotating the radiation image derived from the transparency 60 so that the electrical signal generated by the radiation sensitive device 14 is in a $\rho, \theta$ or PPI format and therefore may be superimposed with the information derived from the receiver 70 upon the output screen 92 of the cathode ray tube 90.

The radiation sensitive device 14 in one particular embodiment of this invention may take the form of a suitable television camera tube such as a slow scan vidicon tube, type No. 7290 as manufactured by the assignee of this invention. It is particularly noted that other suitable vidicon and orthicon tubes as well as other types of television camera devices may be incorporated within the radiation sensitive system 12 without departing from the teachings of this invention. Illustratively, the radiation sensitive device 14 includes an evacuated envelope 16 in which there is disposed at one end an electron gun including a cathode element 18 for providing a flow of electrons, a control grid 20 through which the electrons are directed, and accelerator and focusing electrodes 22 and 24 for directing a beam of electrons onto the surface of a target member 28. Illustratively, the target member 28 includes a layer 32 of a suitable dielectric storage material capable of storing a pattern of charges and having the property of being rendered conductive in response to incident radiation. Further, a radiation transparent layer 30 of an electrically conductive material is disposed upon one surface of the layer 32 to provide an electrode from which an output signal may be derived. A mesh electrode 26 is disposed in a substantially parallel, spaced relation with the surface of the layer 32 in order to collimate the electrons emitted and focused by the electron gun onto the layer 32.

In order to deflect the electrons emitted from the cathode element 18 across the surface of the layer 32 in a repeating linear scan pattern, a suitable deflection yoke or coil 34 is disposed about the radiation sensitive device 14. The yoke 34 illustratively includes only a horizontal deflection coil to provide the desired linear deflection. As shown in FIG. 1, the sweep generator 62 applies a horizontal sweep signal at a frequency corresponding to the PRF (pulse repetition frequency) of the pulses transmitted from the antenna 68. As a result, the beam of electrons emitted from the cathode element 18 will be swept across the diameter of the target 28 at a rate substantially equal to the PRF of the radar system 10. Suitable focusing coils 36 are also disposed about the radiation sensitive device 14 for providing suitable magnetic fields for focusing the beam of electrons emitted by the cathode element 18 onto the surface of the layer 32. In addition, the sweep generator 62 applies a suitable signal to the control grid 20 to provide a suitable blanking period during which the return sweep of the electron beam is made in synchronization with the generation of pulses by the transmitter.

As shown in FIG. 1, a suitable source of radiation 56 uniformly illuminates the map or transparency 60 to provide a corresponding radiation image, which is directed onto the target member 28 of the radiation sensitive device 14. More specifically, the source of illumination 56 may include a serpentine shaped reflector 58, a plurality of lamps 59 which may illustratively be of the fluorescent type, and a layer 38 of translucent material for diffusing the radiation of the lamps 59. Such a source 56 is particularly capable of establishing a uniform illumination across the entire surface of the transparency 60.

In the above defined copending application of Gumphrey and Spangler, a $\rho, \theta$ electrical signal was developed by scanning the television camera device in a $\rho, \theta$ scan pattern. In accordance with the teachings of this invention, the $\rho$ scan is achieved by applying suitable sweep voltage from the generator 62 to the deflection coil 34 in order that the electron beam emitted by the cathode element 18 may be scanned in a repeating, linear pattern across the target element 28. In other words, the electron beam is repeatedly scanned across one single portion of the target element 28. As a result, a signal is derived from the target element 28, which is representative of one line of the radiation image directed thereon. Accordingly, if nothing else were to occur, the signal derived from the target element 28 would be representative of only one line of the radiation image. However, in accordance with the teachings of this invention, the $\theta$ scan is provided by an image rotating assembly 40, which illustratively includes a cylindrical housing 42 and a lens 44 for focusing at least a portion of the image derived from the transparency 60 onto the radiation sensitive target 28. In addition, a suitable means for rotating or optically displacing such as a Dove prism 48 the radiation image derived from the transparency 60 is disposed within the housing 42. Dove prisms are well known in the art and are described on pages 100, 160, 331 and 354 of Optical Instruments, 1945, by Earle B. Brown. The Dove prism 48 serves to rotate the radiation image derived from the transparency 60 at an angular velocity twice that at which the Dove prism 48 itself is being rotated. Thus, the image derived from the image rotating assembly 40 is being rotated across the radiation sensitive target 28. As is shown in FIG. 1, the Dove prism 48 has an optical axis 49 about which the prism 48 is being rotated and about which the radiation image derived from the transparency 60 is itself being rotated. As shown in FIG. 1, the image rotating assembly 40 is so disposed that the optical axis 49 intersects the periphery of the radiation sensitive target 28. In such an arrangement, a full line of scan of the target 28 (from the top of target 28 to the bottom of target 28 as shown in FIG. 1), is used to scan from the center of the incident radiation image to the periphery of the image. As a result, the resolution is increased since the target 28 is used to only scan one half of the rotating radiation image. The assembly 40 and therefore the Dove prism 48 are rotated by a motor 50. More specifically, the motor 50 drives a gear 52 through a drive shaft 51; the gear 52 in turn rotates an annular gear 54 secured to the cylindrical housing 42. The speed at which the assembly 40 is rotated is controlled by a servo 64, which is in turn controlled by a signal derived from the synchro system 66. The Dove prism 48 rotates the radiation image derived from the transparency 60 at a rate twice that at which the Dove prism 48 itself is being rotated. Therefore, the motor 50 and the gears 52 and 54 are arranged in one illustrative embodiment to rotate the Dove prism 48 at a rate equal to one-half the desired rate at which the focused radiation image is to be rotated past the radiation sensitive target 28. In accordance with one aspect of this invention, the image focused onto the target 28 is to be rotated at a rate synchronized with the rotation of the antenna 68. As explained above, this may be accomplished by deriving a signal from the synchro system 66 proportional to the angular velocity of the antenna 68, which signal in turn is applied to the servo 64 to thereby control the rate of speed of the motor 50.

As the focused image is rotated past the target 28, the target 28 is being scanned in a linear fashion to thereby derive a signal. The linear scan of the target 28 is provided by an electron beam beginning at a point coinciding with the optical axis 49 and going linearly across the entire diameter of the target 28 to a point on the periphery of the focused image 28. After a single sweep of the electron beam, a blanking signal is applied to the control grid 20, during which the beam of electrons is brought back for a second sweep beginning again at a point on the target 28 corresponding to the optical axis 49. The point of origin for the second and successive sweeps is the same as the point of origin for the first sweep. Furthermore, the portion of the target 28 which is scanned by the electron beam on the second and successive sweeps is the same portion that is scanned on the first scan. It may be understood that between the first and second sweeps of the target 28 that the focused image has been rotated by a given angular distance so that a new radial line of the focused image is now being detected by the linear scan across the target 28. In this manner, the entire radiation image is rotated past the radiation sensitive target 28 to provide a $\theta$ scan of the transparency 60 and a linear sweep is made by the electron beam generated by the cathode element 18 to provide the desired $\rho$ scan of the image.

It is particularly noted that the target 28 does not saturate, since the integration time is the time difference between successive sweeps of the electron beam and that the speed of the antenna 68 does not affect the read-out. In other word, the integration times of the storage material 32 of the target 28 remains constant between successive sweeps of the electron beam.

The electrical signal derived from the layer 30 of the target 28 is applied to a video amplifier 71, which in turn applies the amplified signal to the video mixer and amplifier 72. The $\rho, \theta$ signal derived through the video amplifier 71 from the radiation sensitive device 14 is combined with the signal derived from the receiver 70 by the video mixer and amplifier 72. Illustratively, the combined signal derived from the video mixer and amplifier 72 may be imposed upon the control grid of the PPI display 90, which in turn provides a combined image upon the screen 92. The $\rho, \theta$ signal derived from the radiation sensitive device 14 is synchronized with the rotation of the antenna 68 and with the transmission of pulses from the transmitter. In a similar manner, the signal derived from the receiver 70 is likewise synchronized with the transmission of pulses and the rotation of the antenna 68. The electron beam directed onto the screen 92 is swept in a $\rho, \theta$ mode by the deflection coils 94 which are energized by the sweep generator 76. In turn, the sweep generator 76 is synchronized by the radar timing generator 74 and the synchro system 66 with the rotation of the antenna 68 and the transmission of the radar pulses by the transmitter. Thus, the visual display provided upon the screen 92 will be in a $\rho, \theta$ format and the superimposed images derived from the transparency 60 and the receiver 70 will be synchronized with each other to provide a composite image as shown in FIG. 3B.

Figure 3A:
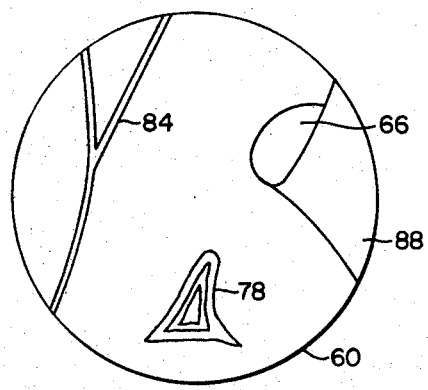
FIGS. 3A and 3B are respectively a view of a map to be inserted from the radiation sensitive system of FIG. 1 and the resultant radiation image displayed upon the PPI display of FIG. 1 showing the map of FIG. 3A superimposed upon the information received from the receiver of the radar system.
Figure 3B:
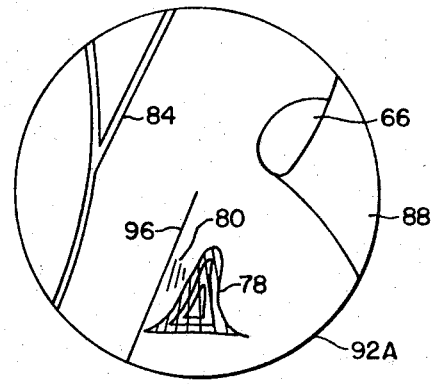

Referring now to FIGS. 3A and 3B, there is illustratively shown the indicia of the transparency 60 and the superimposed image 92A of the transparency 60 and the blips received from the radar receiver 70 as displayed upon the screen 92 of the cathode ray tube 90. With re- and to FIG. 3A, there is shown the map 60 presenting information as to position of a river 84, the mountain 78, the city 66 and a body of water 88. Illustratively, the lines corresponding to the various objects of the map 60 appear as opaque lines with remaining portions of the map being substantially transparent to radiation directed therethrough. The opaque lines of the map 60 are sensed by the target member 28 of the radiation sensitive device 14. An electrical signal is derived from the target 28 in a $\rho, \theta$ format by respectively the linear scan of the target 28 and the rotation of the Dove prism 48. The signal is applied through the video amplifier 71 and is combined with the signal derived from the receiver 70 by the video mixer and amplifier 72 to be applied to the cathode ray tube 90. The image 92A appearing upon the screen 92 is composed of lines corresponding to the outlined objects 84, 66, 88, 78, 80 and 96 displayed against the dark background. As the scan of the beam of electrons (indicated by the line 96) is rotated about the display screen 92, various objects such as the airplane 80 will be displayed in the form of bright dots blips. As shown in FIG. 1, the antenna 68 is diposed to receive the return or echo signals from the airplane 80 and the mountain 78. These objects will be displayed as blips upon the screen 92 to coincide as shown in FIG. 3B with the outlines of the map 60. This will enable an observer to determine the distance of the airplane 80 detected by the radar system 10 from the city 66 or the river 84. It is noted that the position of the map 60 may be manually adjusted by the operator to insure a correct correlation between the bright spot representing the airplane 80 and the indicia upon the map 60 by correlating the position of the mountain 78 as it is observed by the radar system 10 and the superimposed image of the mountain 78 from the radiation sensitive device 14. Further, such a radiation sensitive system 12 allows the superimposed image of the map 60 to be electronically adjusted, focused and/or enlarged to meet the requirements of the radar system 10.

Figure 2A:
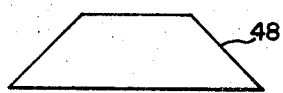
FIGS. 2A, 2B, 2C and 2D are views of various illustrative means for imparting the rotational movement to the radiation image, which means may be incorporated within the radiation system of FIG. 1.
Figure 2B:
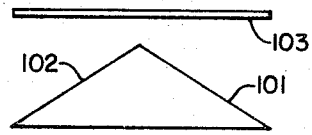
Figure 2C:
Figure 2D:
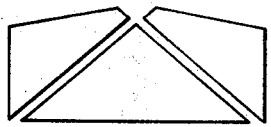

Though the means for imparting an optical rotation to the radiation image derived from the transparency 60 has been illustratively described as a Dove prism 48 (see FIG. 2A), it is noted that other optical devices may be incorporated into the radiation sensitive device 14 without departing from the teachings of this invention. Any optical means which produces optical inversion in one plane without substantial deviation will serve the same purpose as the Dove prism 48, and may be placed at a suitable point that other conditions may permit. Reference is made to FIGS. 2B, 2C and 2D which show other typical devices which are capable of imparting the desired rotation to the radiation image derived from the transparency 60 and which could be mounted within the assembly 40. FIG. 2B shows a series of three mirrors 101, 102 and 103 for imparting a rotational motion to the radiation image. FIG. 2C shows a rotating means known in the art as a Pechan prism consisting of two elements disposed together as shown at FIG. 2C. These and other similar devices are described in the above identified publication. FIG. 2D shows another type of image rotator consisting of three elements for rotating the radiation image.

In summary, there has been shown a radiation sensitive system capable of providing a $\rho, \theta$ output signal of a radiation image at a relatively inexpensive cost and with an improved resolution. Further, the radiation sensitive device of this invention is capable of providing a $\rho, \theta$ output signal of a radiation image without the costly preparation of photographic negatives or transparencies. Instead, suitable transparencies may be prepared by tracing of an available map and using a typical television camera device as described above to sense the image derived from the transparency. In accordance with the teachings of this invention, the $\rho$ scan may be achieved with a television camera by linearly scanning the storage target thereof and of providing the $\theta$ scan by optically rotating the radiation image as with a Dove prism or other suitable device.

Since numerous changes may be made in the above described apparatus and different embodiments of the invention may be made without departing from the spirit thereof, it is intended that all matter contained in the foregoing description or shown in the accompanying drawings shall be interpreted as illustrative and not in a limiting sense.

What is claimed is:

1. A system for sensing a radiation image including a device for sensing a series of lines of said radiation image and providing an electrical signal corresponding to the variations of intensity of said lines, said device including a target member capable of storing said radiation image as a corresponding pattern of charges, said device further including means for scanning said target in a linear pattern with a beam of electrons; and first means for rotating said radiation image across said device whereby said electrical signal is generated by said device in a $\rho, \theta$ format.

2. A radiation system as claimed in claim 1 wherein said device takes the form of a television camera tube including a storage target capable of storing at least a portion of said radiation image as a corresponding pattern of charges and an electron gun for repetitively scanning in a linear fashion a beam of electrons across said target member.

3. A radiation sensitive system as claimed in claim 2 wherein said first means rotates said radiation image about an axis, said target being scanned in a linear fashion from a starting point, and said first means being so disposed that said axis coincides with said starting point.

4. A radiation system as claimed in claim 2 wherein said first means includes an optical device for rotating said radiation image as a function of the rotational velocity of said optical device and second means for rotating said optical device.

5. A radiation sensitive system as claimed in claim 4 wherein said optical device takes the form of a Dove prism.

6. A radar system including a radiation sensitive system as claimed in claim 1, wherein there is included an antenna for transmitting and receiving radar signals, a receiver associated with said antenna, display means associated with said receiver for indicating the bearing and range of the objects sensed by said antenna, means for rotating said antenna, and means for synchronizing the linear scan of said beam of electrons across said target member with the transmission of radar signals from said antenna and the rotation of said radiation image with the rotation of said antenna.

7. A radar system including the radiation system as claimed in claim 4, including an antenna for transmitting and receiving radar signals, a receiver associated with said antenna for indicating the bearing and range of the objects sensed by said antenna, display means associated with said receiver for displaying the bearing and range of the objects sensed by said antenna, means for rotating said antenna, a synchro system sensing the rotation of said antenna and providing an output signal indicative of the position of said antenna, synchronizing means responsive to the transmission of radar signals from said antenna for initiating the linear sweep of said beam of electrons across said target, drive means responsive to said output signal of said synchro system for rotating said optical device at a velocity such that said radiation image is rotated past said target member at a velocity corresponding to the angular velocity of said antenna, said synchronizing means further correlating the display pattern of said display means with the rotation of said display means and the transmission of radar pulses from said antenna, and circuit means for mixing the signal derived from said receiver and the signal derived from said television camera tube and for applying the derived composite signal to said display means.

8. A radiation system as claimed in claim 2 wherein said electron gun repetitively scans said beam of electrons across a single portion of said target member.

9. A system for sensing a radiation image and for producing an output which reproduces said radiation image, said radiation image containing information of varying transmissivity to light, comprising; means for illuminating said radiation image, means for scanning the light transmitted through said radiation image, said scanning means effecting a repetitive one line scan; and means for rotating the information contained on said radiation image in such a manner that all of said information is transported past said one line scan.

10. The system of claim 9 wherein said rotating means includes an optical system disposed between said scanning means and said radiation image.

11. The system of claim 10 wherein said optical system includes a Dove prism.

12. The system of claim 10 wherein the optical axis of said optical system is aligned with an edge of said scanning means.

13. The system of claim 12 wherein the optical axis of said optical system is aligned with the center of said radiation image.

References Cited

UNITED STATES PATENTS

| 2,884,540 | 4/1959 | Shockley. | |
| 3,113,311 | 12/1963 | Searle et al. | 343—11X |
| 3,290,674 | 12/1966 | Calhoon | 343—5 |
| 3,388,395 | 6/1968 | Gumphrey et al. | 343—11 |

RODNEY D. BENNETT, Primary Examiner

M. F. HUBLER, Assistant Examiner

U.S. Cl. X.R.

343—5, 6